(12) United States Patent
Caramico et al.

(10) Patent No.: US 6,771,878 B1
(45) Date of Patent: Aug. 3, 2004

(54) SYSTEM FOR STORING, RESTORING AND DISTRIBUTING VIDEO-FILMS FROM OPTICAL DISKS

(75) Inventors: Luigi Caramico, Rome (IT); Mario Mene', Rome (IT)

(73) Assignee: Systems S.p.A., Rome (IT)

( * ) Notice: Subject to any disclaimer, the term of this patent is extended or adjusted under 35 U.S.C. 154(b) by 0 days.

(21) Appl. No.: 09/647,692

(22) PCT Filed: Jun. 2, 1999

(86) PCT No.: PCT/IT99/00157
§ 371 (c)(1),
(2), (4) Date: Oct. 3, 2000

(87) PCT Pub. No.: WO00/46801
PCT Pub. Date: Aug. 10, 2000

(30) Foreign Application Priority Data

Feb. 3, 1999 (IT) .................................. RM99A0081

(51) Int. Cl.[7] ............................. H04N 5/91; H04N 7/00
(52) U.S. Cl. ...................... 386/46; 386/125; 369/30.06
(58) Field of Search ................... 386/46, 125; 369/30, 369/30.06

(56) References Cited

U.S. PATENT DOCUMENTS

| 5,615,345 A | 3/1997 | Wanger |
| 5,619,339 A | 4/1997 | Iguchi et al. |
| 5,642,337 A | 6/1997 | Oskay et al. |
| 5,766,018 A | 6/1998 | Terashima |
| 5,959,945 A * | 9/1999 | Kleiman ...................... 381/81 |
| 6,230,074 B1 * | 5/2001 | Shinkai ...................... 700/214 |
| 6,408,301 B1 * | 6/2002 | Patton et al. ............... 707/102 |
| 6,563,771 B1 * | 5/2003 | Debiez .................... 369/30.79 |
| 2001/0033736 A1 * | 10/2001 | Yap et al. ..................... 386/46 |

FOREIGN PATENT DOCUMENTS

WO  WO 97/08633  3/1997

* cited by examiner

Primary Examiner—Chris Kelley
Assistant Examiner—Alicia M. Duggins
(74) Attorney, Agent, or Firm—Young & Thompson

(57) ABSTRACT

A system for storing, restoring and distributing video-films, based on optical disks of very high definition, that makes use of DVD disks (Digital Versatile Disk) as a support for the storing of films, so that said films may be stored onto said disks in a compressed format according to the MPEG-2 standard, and where the algorithm allows to modify the compression factor according to the requested quality from a few Mbps to a considerable number of Mbps.

10 Claims, 4 Drawing Sheets

SYSTEM FOR STORING, RESTORING AND DISTRIBUTING VIDEO-FILMS FROM OPTICAL DISKS

BACKGROUND OF THE INVENTION

The present invention concerns a system for storing and restoring video-films, based on optical disks of very high definition.

DESCRIPTION OF THE RELATED ART

At present, all television and cinema archives use magnetic supports, like tapes and cassettes, of different formats. Those supports are characterized in the worsening of the signal quality due to time and ambient; furthermore, the storing supports request spaces that are often precious.

The use of the known storing systems for video-films shows the following disadvantages:

the manual managing of the storing supports: the use of magnetic cassettes as a support for the storing of films makes the managing of great archives rather difficult. In_fact, it is difficult or rather expensive to use robotic systems in the real registration phase (i.e. the assignation of a material place to the cassette to be kept) as well as in the search phase (i.e. the finding of the material space previously assigned);

the need of duplication of the contents in case of contemporary use by a plurality of users: the film that has been recorded onto a cassette may not be used at the same time and independently by more than one person. Therefore, it is necessary to make a copy of the cassette each time the,use of the same is requested by a plurality of persons at the same time;

the magnetic tape is a recording support that undergoes wear due to use an ageing, and this means that the recorded signal undergoes an unavoidable decay with time passing by, the reading and the copies made. This problem has been partially attenuated by the introduction of digital recording techniques, but is far from being solved;

there is no possibility of checking the content before use: the check of the real content of the cassette and therefore its conformity to the content requested may be performed only by a videorecorder. Therefore, the cassette must be sought for in the archive, put into a videorecorder and checked about its content. In very vast archives with approximate indexing, the search for the requested cassette may become a long lasting affair;

the signal may not be distributed on geographic data nets: the recording format onto the tapes used until now does not allow an easy distribution of the signal onto geographic data nets, because a very high band is requested or also it is necessary to perform a compression before transmission. This problem also returns to the need that the archive of the video-films be near to the place where the recorded films will be used;

the space taken and the many formats of the recording supports: the dimension of the magnetic cassettes requests great rooms for storing. Furthermore, the progress in the recording supports has caused in general a non-homogeneous composition of the video archives, with cassettes of different shape and therefore the need of readers for all formats;

the cost of the recording supports: the decay due to time and to wear of the magnetic tapes forces to use materials of very high quality in the realization of professional video-cassettes, and this implies a very high cost of the cassettes.

SUMMARY OF THE INVENTION

It is the aim of the system according to the present invention to supply a means for recording films and for using the recorded material that is as much as possible automated, thus simplifying the searching, loading, use and recording operations of video-films.

The suggested system makes use of DVD disks (Digital Versatile Disk) as a support for the recording of films; these disks are the latest standard for recording digital information onto an optical support, with the dimensions of a conventional audio CD (diameter: 12 cm), so that said films may be recorded onto said disks in a compressed format according to the MPEG-2 standard, which is the standard universally accepted for codification and compression of the digital video, and where the algorithm allows to modify the compression factor according to the requested quality, from a few Mbps to a considerable number of Mbps. The different recording technology used allows to solve the problems shown by the known recording systems.

BRIEF DESCRIPTION OF THE DRAWINGS

The system according to the present invention will be now described more in detail, relating to the enclosed drawings in which the figures show an embodiment of the same.

DESCRIPTION OF THE PREFERRED EMBODIMENTS

The enclosed figures show a recording and editing system for video-films based onto optical disks of very high definition, wherein the video archive contains a great number of DVD disks that may be automatically handled while for all consultation and,elaboration said video-films are loaded onto a powerful computer having the functions of a video-server so that, placing the films onto a quick support as a hard-disk, not only a simple consultation from a DVD may be obtained, but some additional functions are opened like the independent use of the same film by a plurality of persons at the same time.

According to the present invention, the consultation of the archive takes place by means of remote consoles placed in each point of use of the video signal, e.g. in the editing rooms, which allow the search and a possible preview of the material found.

The same console allows the conventional operations of loading and transmission of the requested film through a virtual interface similar to a switch board of a videorecorder, but without the need of materially handling the video support.

The whole system is run by means of a special software that communicates and coordinates the checking softwares of the single apparatuses.

Figure 1:
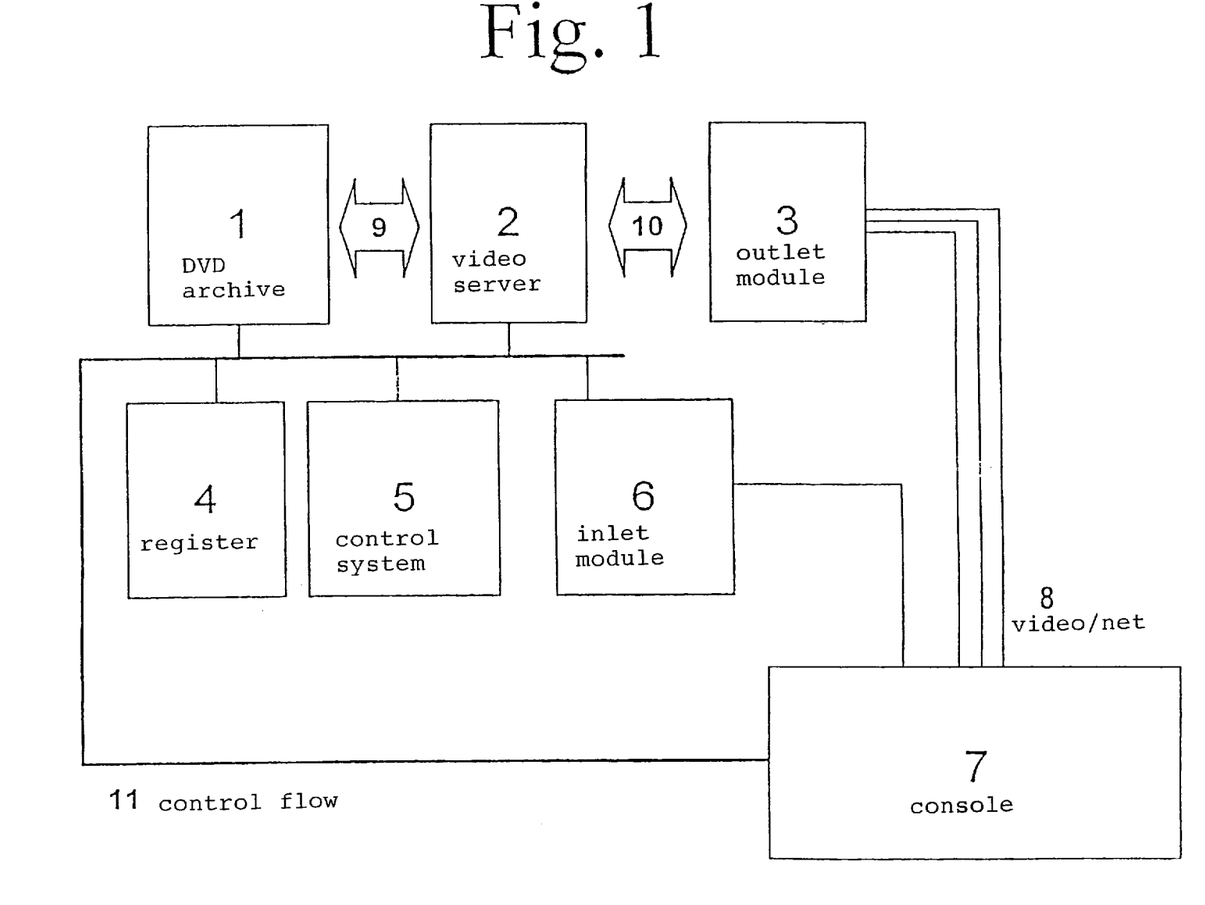
FIG. 1 shows a block scheme of the functional architecture of the system according to the present invention.

The elements composing the hardware, shown in the functional block diagram of FIG. 1, are:

a DVD archive 1 based onto a juke-box that realizes the storing and handling functions of DVDs, consisting of a robotic system that can electronically run and mechanically handle a theorically endless number of disks, so as to eliminate—with following time and money saving—all operations that previously were performed manually with cassettes and tapes; the checking system of the juke-box transfers the content of the chosen films to the hard-disks of the video server;

a video server 2 into which the films recorded on the DVDs, and not directly used for the production of the requested video signal, are being transferred; the using points of the signal are provided with video connections with the video server, that may be compared to a great buffer, based onto ultra-quick SCSI disks and run by a dedicated microprocessor, so as to be able to receive video films from the DVD archives and to send them to the outlet module;

an outlet module 3 that integrates outlet cards of the non-compressed analog/digital kind and of the standard DVD multiplex MPEG-2 kind;

cards for a non-compressed analogic and digital outlet, which convert the flow coming from the readers DVD into a standard television signal of the PAL or NTSC kind, according to the features of the recorded video, and the outlet of which may be synchronized with other video signal sources (gen-lockable) and usually is supplied in composite, optionally in components and in non-compressed digital;

outlet cards MPEG-2 that do not convert the MPEG-2 flow coming from the readers, but which combine a plurality of flows containing one single film (single program transport stream) into one single outlet flow containing all films (multiple program transport stream); the lay-out and the flow combination manner are run by the control system according to the needs of the user, while the outlet flow is supplied onto a LVDS or ASI interface, as provided by the DVB standard;

a console 7 for running said system provided with the using points of the signal, e.g. editing consoles, from which it is possible to perform searches in the archives and to check the loading and the playout of the requested films, while the managing of the digital video source takes place with operations similar to those of a professional video-recorder;

an inlet module 6 for recording new audio/video contents, consisting of a system for the compression of the video signal into MPEG-2 and the further masterizing of the DVD support so that, once the DVD has been recorded, it may be inserted into the juke-box and is ready for use while, at the same time, it will be indexed according to its content and by key-words, for an easy finding in the search operations;

a register 4 in which all films are inserted and indexed according to their content, author, date and with key-words so as to allow a quick finding in the search operations, realized by a PC with a server outline and registration hardware, that may be remote consulted by the consoles placed in the points in which the video signal is used (for the search of the contents) and by the inlet module (for the insertion of new titles);

a control system 5 that manages and synchronizes the functioning of all components of the system, having a unique external control interface, so that the whole system is run locally through a graphic interface or remote through the transmission of commands onto serial or net interface; said system is in interface condition with the archives for the recording of the content of the system's DVDs, for performing its control and coordination functions; the system is automatically updated each time DVDs are loaded or eliminated from the system;

a software management: as all blocks of the system have electronics and software for the remote control, and as a data net provides for the connection of the different system blocks, it is a peculiar feature of the present invention that the whole DVD archives is run only in computerized and automatized manner, so that from each utilization console it is possible to enter all functions of the system;

a juke-box software, which has the purpose of performing management and control operations of the robot: the disks' archives is run in a clear manner by means of a logic interface that puts the control software of the juke-box into communication with the database for the management and search of the titles, so that the user automatically and intuitively consults the whole DVDs archives according to the functions, the most important of which are:
* Search
* By contained words
* Characters
* Geography
* Disk consultation
* Preview
* Show the entire content
* Split video
* Update archives
* Load new disks
* Unload
* Select disks to be eliminated.

Furthermore, there are some functions for the control and the running of the robot:
* Number of available disks
* Number of hours used
* Entry statistics
* Users' statistics.

The user console 7 allows all control and management operations of all sub-systems by means of data connection through ATM net 11; furthermore, it allows the use of video signals in outlet from the system through the video net 8.

A connection is provided from the console to the robot for the check of the disks' search and loading operations, with possible operations like:
* Loading
* Unloading
* List
* Search.

The connection with the video server checks the consultation of the films unloaded onto the hard-disk; the available operations are the same that can be performed with a professional video-recorder:
* Play
* Stop
* Pause
* Fast forward/backward
* Slow motion
* Track/Title select
* Skip next/previous
* Repeat (track/title/all)

* A-B repeat
* Shuffle
* Program.

The components of the system's blocks according to the present invention may be described as follows:

the robotic archives has an external interface and all following management and monitoring functions are run by the control system:

* General outline and calibration
* Advising about the status of the system
* Loading of new DVDs into the robotic archives
* Elimination of DVDs from the robotic archives
* list of the current DVDs
* Status of the current DVDs
* Position of the DVD X in a reader Y
* Number of current disks
* Number of used hours
* Entry statistics.

Figure 2:
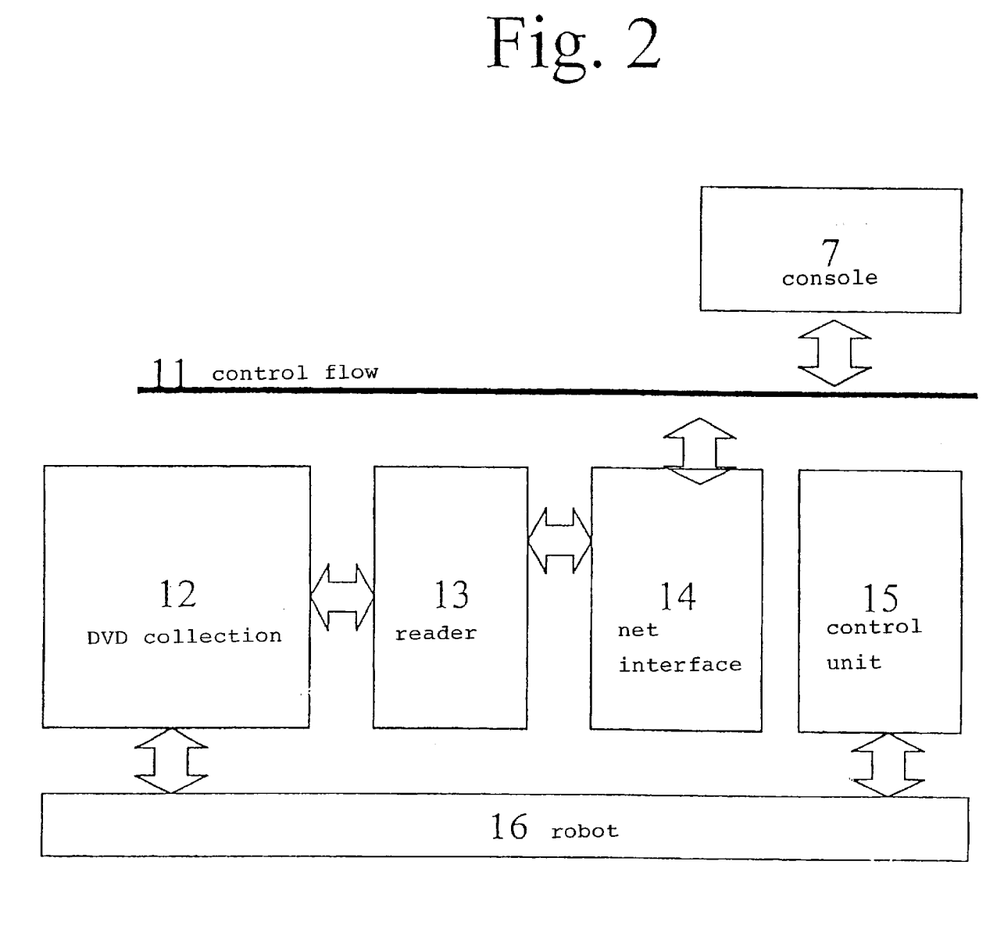
FIGS. 2, 3 and 4 show a block scheme respectively an example of a DVD rchive, of the digital outlet module and of the corresponding analogic module.

According to the functional blocks scheme of the juke-box, shown in FIG. 2 with the connection lines of the main modules, it is sufficient—for loading or unloading new disks from the archives—to use a container prepared on purpose and that has the capacity of loading up to 100 disks; for eliminating some disks from the archives, it is sufficient to introduce via software the elimination criteria, and the operation will be automatically performed.

The robot 16 for the handling of DVD disks is a vanguard instrument in the field of robots, in which the sliding on the horizontal axis is guided by tracks that allow quick movements, while mechanic arms are able to handle four DVD disks at the same time and to move them from the DVD collection 12 to the readers 13 with an entry time that varies from two to seven seconds.

The control unit 15 of the robot consists of microprocessor systems of standard kind, with the following functions:

* The setting of the parameters according to the outline of the modules
* The calibration of the robot's position
* The visualization of the functioning status
* The management of the external control.

The DVD readers 13 don't have an external interface, and all management and monitoring functions are run by the control system. The functions of the DVD readers are the following:

* Play
* Stop
* Pause
* Fast forward/backward
* Slow motion
* Repeat
* Open the loading drawer
* Close the loading drawer
* Advising about the status of the system.

The outlet signals from the archives are sent to the video server through the net interface 14 ATM standard.

The video server 2 is the system that makes available the films contained in the juke-box for the standard video treatment and for sharing. The main features of the system according to the, present invention are performance and reliability, which are obtained by means of a careful selection of the recording units. The entry to controlled units take place through high speed SCSI channels. The control system of the video server, that has the function of managing the loading and unloading on hard-disk and of playout of the films, allows the control of the video server by means of a graphic interface directly from the consoles present in the two editing rooms.

The recording unit consists of a high speed hard-disk system and is the temporary support for the running of the MPEG data flow, with the following keys:

* the dimensions, such as to contain video informations for a number of hours that may satisfy all who request them;
* the speed: for a real time treatment, it is necessary that the support has optimal performances of data rate;
* the modules: they allow an easy expansion in case of request or heavy enlargment of recording.

Figure 3:
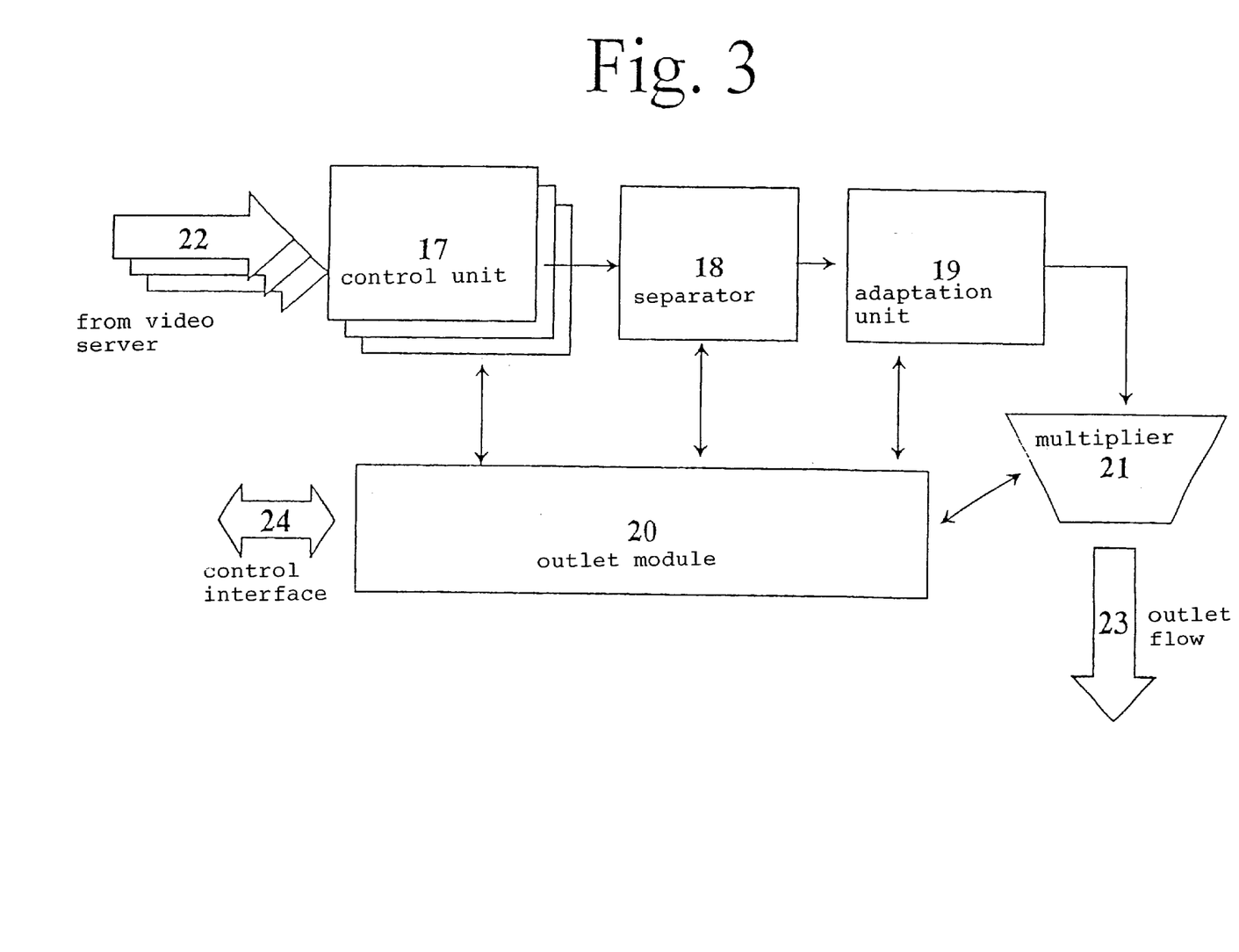
Figure 4:
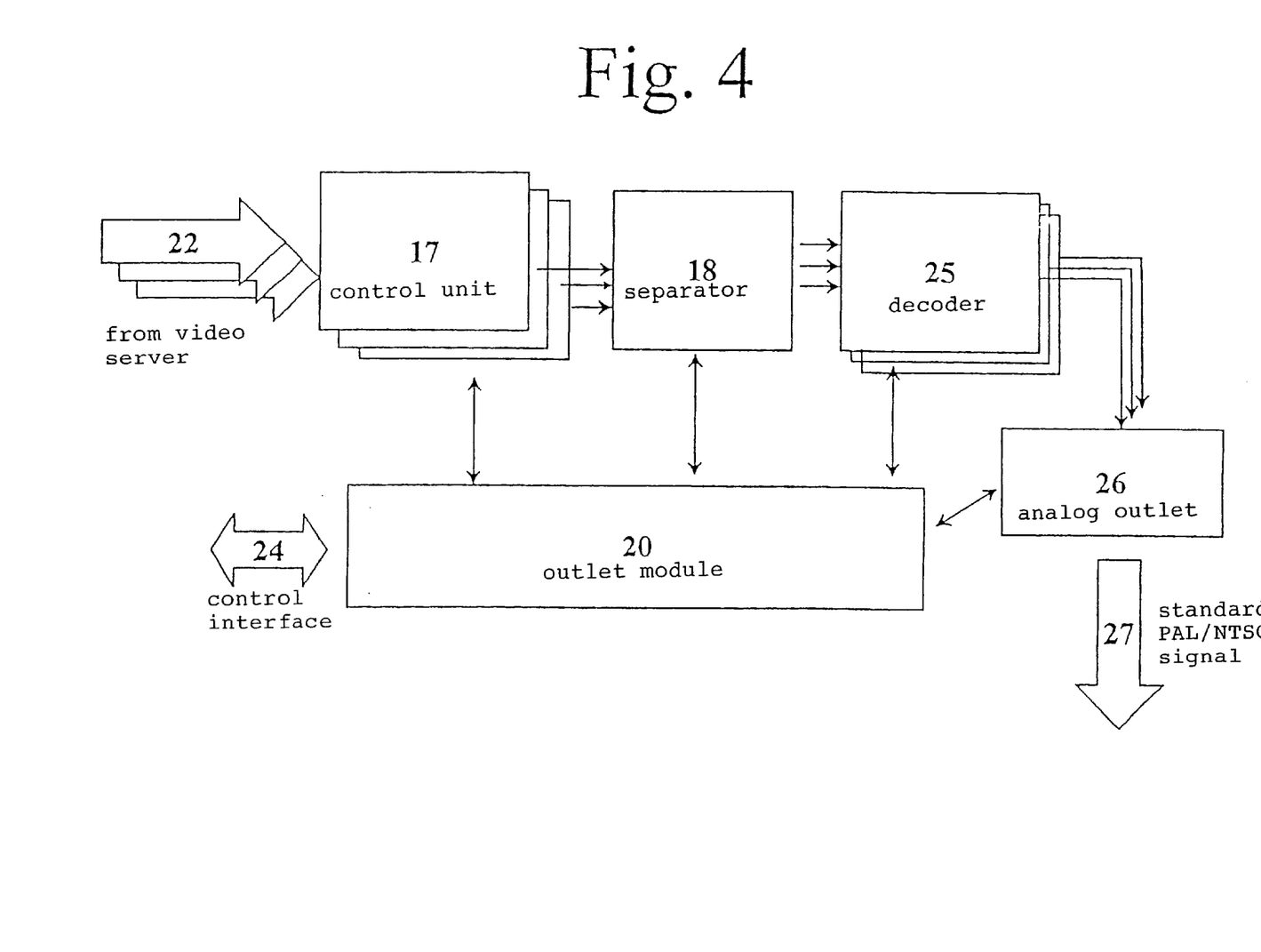

The outlet module 3 integrates in an appropriate manner non-compressed outlet cards of the analogic/digital kind, as shown in FIG. 4, and of multiplex MPEG-2 DVD standard kind, according to FIG. 3. The functions performed by the two different kinds of cards are, for the non-compressed analogical and digital outlet cards:

* conversion of the flow from a reader X to a composite outlet
* conversion of the flow from a reader X to a component outlet
* conversion of the flow from a reader X to a digital outlet
* Advising about the status of the system, while the functions for the MPEG-2 outlet cards are:
* selection of the entry flows
* definition of the inlet flows' parameters
* definition of the outlet flows' parameters
* selection of outlet interface
* advising about the status of the system.

The cards for the non-compressed analogical and digital outlet convert the flow coming from the video server 22 into a standard television signal 27 of the PAL or NTSC kind, according to the features of the recorded video. The inlet signal is run by the control unit 17 of the high speed signal and sent to the sent signal commutator/separator 18 which sends them to decoder 25 MPEG-2, according to the command sent by the control system of the outlet module 20. The decodified signal is now set to the analog outlet cards 26. The outlet of the card may be synchronized with other sources of video signals (gen-lockable) and is usually supplied in composite, optionally in components and in non-compressed digital.

The outlet signal is sent to the analogic commuting matrix, if present, or directly to the apparatuses in the editing room.

The digital outlet cards do not convert the MPEG-2 flow coming from the readers; they combine a plurality of flows 22 containing one single film (single program transport stream) into one unique outlet flow 23 containing all films (multiple program transport stream). The combination of the flows is realized by means of the adaptation units of the data signal 19 which have the task of assuring a data flow at constant speed, and by means of the multiplying unit 21 which materially combines the digital flows calculating the parameters of the outlet flow according to the outline determined on the central control system and sent, through the control interface 24, to the control system of the outlet module.

The outline of the card and the combination possibilities of the flows are managed by the control system 20 according to the needs of the user. The outlet flow 23 is supplied on an interface LVDS or ASI, as provided by the DVB standard.

The central control system 5 runs and synchronizes the functioning of all components of the system, having a single external control interface. Consequently, said system must be able to send all commands concerning the available functions into the many under-systems and possibly, to translate orders from the outside into orders understandable for the different under-systems. An order from the outside could be, e.g., "send the film x on air on outlet y ": this command must be turned into the following sequence of commands:

* Search film x
* Open the door of reader Z
* Load the relative DVD into reader Z
* Close the door of reader Z
* Transfer of the film K from reader Z to the video server
* Play the film K from the video server onto outlet y.

The control system must also be able, for performing said complex operation, to manage and signal possible error situations due to bad functioning or to wrong commands. The main functions of the control system are the following:

* Search of the titles
* Updating of the contents of the archives
* Outline of the different under-systems
* Control and advising about the status of the different under-systems
* Control and advising about its own status
* Interpretation of the commands from the local control interface
* Interpretation of the commands from remote control interface, by means of a serial
* Interpretation of the commands from remote control interface by means of LAN net
* Performing of the program from local interface; connections and interfaces.

The connections between the modules of the system are devided into two fundamental parts:

* data connections, for running the control flows 11 and the monitoring of the devices, and for the transfer of the MPEG films 9 and 10 onto the video servers, realized in LAN ATM technology;
* video connections 8, for the transport of audio and video signals from the video servers to the devices in the cutting room, realized in a coaxial cable.

For what concerns the advantages, the system according to the present invention solves the problems deriving from storing systems based onto magnetic tapes, and furthermore allows:

the automatized management of the archives supports;

the use of DVDs as a support for storing films, which simplifies the management of great archives, because the need for great spaces occupied by the storage supports is reduced and all operations of searching and loading of the supports may be performed in a simple manner and by means of robotized systems;

the quality of the video signal: the DVD disk and the optical storing technology eliminate the quality decay of the signal caused by time and wear, as the optical storing support doesn't decay with time and is not damaged during use, as there are no mechanical contacts during reading reduction of space needed and uniformity in the archives formats: the dimension of the DVDs allow to reduce the space needed for archives. Furthermore, the use of MPEG-2 as international standard for storing films in digital format allows to realize homogeneous archives for what concerns the quality level and the archives format;

inexpensiveness of the storing supports: the possibility of making use of DVDs not only for storing videos, but also data of any kind, allows the use thereof as a universal and inexpensive data support;

the contemporary use of the contents between many users: once the video content on a DVD is transferred onto the video server, the use therefore is open to a plurality of users in a completely indepedent and contemporary manner, without any need of duplication;

the possibility of a preview: the checking of the real content of the DVD may be performed in an easy manner, without transferring the content onto the video server. Therefore, it is possible to preview the content of a DVD into a maximum time of seven seconds from the selection, without moving from the console of the system. The accurate organization of the text archives, furthermore, alows the selection of the desired material;

the destribution of the signal onto geographic data nets: the storing format used on the DVDs allows an easy distribution of the signal onto geographic data nets; and this also allows to eliminate the need of the archives being near to the place where those stored films are being used;

remote archives and enlarging of the users: the interface of the contents' archives makes the remote consultation thereof possible, on a connection of the internet kind. This makes possible a remote control of the working stations ad opens new possibilities of exploiting the audio/video contents of the archives, as e.g. the sale of immages and/or clips, which could not be realized with a magnetic tape archives;

an analogic and/or digital outlet: the system according to the present invention may supply—according to the ambient of use—a standard analogic or non-compressed digital outlet, as well as—in the case of a digital television—it may supply directly in output a compressed digital MPEG-2 outlet in single or multiple program transport stream format, according to the DVB standard. This latter outlet allows to eliminate the need of the real-time encoders MPEG-2, with a further saving possibility, a modular and expansible architecture: the architecture of the system according to the present invention is extremely modular and may be fitted, from time to time, to the needs of the user, selecting the capacity of the archives, the number of the readers, the number and the typology of the outlet cards. These parameters may be modified according to new needs; reliability and reset: the reliability features of the single components and the modular architecture make the system according to the present invention particularly reliable and restorable in very quick times;

safety: all managing operations of the archives are protected by a password, so that only prepared and authorized personnel may enter the system. It is possible to provide different entering levels for the common users, who will be allowed only to consult and make use of the archives; for the managers, who may add, eliminate or modify the contents of the archives; and for the system administrator; who may perform all maintenance and supervision tasks for the system;

low maintenance costs: the system according to the present invention doen't need a constant or complex managing. For the routine operations, a special training is provided for the personnel The system is provided for simplifying as much as possible the daily use as well as the programmed managing and maintenance operations.

What is claimed is:

1. A system for storing and restoring video-films, based on optical disks of very high definition, characterized in a DVD archive (1) based onto a juke-box that realizes the storing and handling functions of DVDs, consisting of a robotic system that can electronically run and mechanically handle a number of disks, so as to eliminate all operations that previously were performed manually with cassettes and tapes; the checking system of the juke-box transfers the content of the chosen films to the hard-disks of the video server;

a video server (2) into which the films recorded on the DVDs, and not directly used for the production of the requested video signal, are being transferred; usage points of the signal are provided with video connections with the video server, based onto ultra-quick SCSI disks and run by a dedicated microprocessor, so as to be able to receive video films from the DVD archive and to send them to an outlet module;

the outlet module (3) that integrates outlet cards of the non-compressed analog/digital kind and of the standard DVD multiplex MPEG-2 kind;

cards for a non-compressed analog/digital outlet which convert the analog/digital signal into a standard PAL or NTSC signal, according to the features of the recorded video, and the outlet of which synchronized with other video signal sources (gen-lockable) and usually is supplied in composite, optionally in components and in analog;

outlet cards MPEG-2 that do not convert the MPEG-2 flow coming from the readers, but which combine a plurality of flows containing one single film (single program transport stream) into one single outlet flow containing all films (multiple program transport stream); the lay-out and the flow combination manner are run by the control system according to the needs of the user, while the outlet flow is supplied onto a Low Voltage Differential Signal or an Asynchronous Serial Interface, as provided by the Digital Video Broadcasting standard;

a console (7) for running said system provided with the usage points of the signal, from which it is possible to perform searches in the archive and to check the loading and the playout of the requested films, while the managing of the digital video source takes place with operations similar to those of a professional video-recorder;

an inlet module (6) for recording new audio/video contents, consisting of a system for the compression of the video signal into MPEG-2 and the further mastering of the DVD support so that, once the DVD has been recorded, it may be inserted into the juke-box and is ready for use while, at the same time, it will be indexed according to its content and by key-words, for an easy finding in the search operations;

a register (4) in which all films are inserted and indexed according to their content, author, date and with key-words so as to allow a quick finding in the search operations, realized by a PC with a server outline and registration hardware, that may be remotely consulted by the consoles placed in the points in which the video signal is used for the search of the contents and by the inlet module for the insertion of new titles;

a control system (5) that manages and synchronizes the functioning of all components of the system, having a unique external control interface, so that the whole system is run locally through a graphic interface or remote through the transmission of command onto serial or net interface; said system is in interface condition with the archive for the recording of the content of the system's DVDs, for performing its control and coordination functions; the system is automatically updated each time DVDs are loaded or eliminated from the system;

a software management: as all blocks of the system have electronics and software for the remote control, and as a data net provides for the connection of the different system blocks, the whole DVD archive is run only in computerized and automatized manner, so that from each utilization console it is possible to enter all functions of the system;

a juke-box software, which has the purpose of performing management and control operations of the robot: the disks' archive is run by means of a logic interface that puts the control software of the juke-box into communication with the database for the management and search of the titles, so that the user automatically and intuitively consults the whole DVDs archive according to the functions provided.

2. A system for storing and restoring video-films, based on optical disks of very high definition according to claim 1, characterized in that said user console (7) allows all control and managing operations of the different under-systems through data connection by means of ATM net (11), and further allows the use of the video signals in output from the system through the video net (8).

3. A system according to claim 1, characterized in a robot (16) for the handling of DVD disks, in which the sliding on the horizontal axis is guided by tracks which allow quick movements, while mechanic arms handle four DVD disks and transfer them from the DVD collection (12) to the readers (13) with an entering time that varies from two to seven seconds.

4. A system according to claim 1, characterized in that said video server (2), to which the outlet signals from the archives are sent through the standard ATM net interface (14), consists of a system that makes available the films contained in the juke box for the treatment in a standard video format and for the sharing, while the control system thereof is performed by means of a graphic interface directly from the consoles of the two cutting rooms.

5. A system according to claim 1, characterized in that said outlet module (3) integrates cards for analogic/non-compressed digital outlet and of the standard multiplex MPEG-2 DVB kind.

6. A system according to claim 1, characterized in cards for the analogic and non-compressed digital outlet, which turn the flow coming from the video server (22) into a standard television signal (27) of the PAL or NTSC kind according to the features of the stored video, while the inlet signal is run by the control unit of the high speed signal (17) and is addressed to the data signal commuter/separator (18) which sends them to the MPEG-2 decoder (25) according to the commands sent by the control system of the outlet module (20), and the decoded signal is then sent to the analogic outlet cards (26).

7. A system according to claim 1, characterized in that the digital outlet cards don't change the MPEG-2 flow coming from the readers, but they combine a plurality of flows (22) containing one single film (single program transport stream) into one single outlet flow (23) containing all films (multiple program transport stream), while the combination of the flows is realized by means of the adaptation units of the data signal (19), which have the task to assure a data flow at a constant speed, and the multiplying unit (21) materially combines the digital flows by calculating the outlet flow's parameters according to the outline set on the central control system and transmitted, through the control interface (24), to the control system of the outlet module.

8. A system according to claim 1, characterized in that the outline of the card and the combination possibilities of the flows are run by the control system (20) according to the needs of the user, while the outlet flow (23) is supplied onto an LVDS or ASI interface according to the DVB standard.

9. A system according to claim 1, characterized in that said central control system (5) manages and synchronizes the functioning of all components of the system with one single external control interface.

10. A system according to claim 1, characterized in that the connections between the modules of the system are divided into two fundamental parts:

- data connections, for running the control flows (11) and the monitoring of the devices, and for the transfer of the MPEG films (9) and (10) onto the video servers, realized in LAN ATM technology;
- video connections (8), for the transport of audio and video signals from the video servers to the devices in the cutting room, realized in a coaxial cable.

* * * * *